Sept. 18, 1956 J. R. ERWIN 2,763,426
MEANS FOR VARYING THE QUANTITY CHARACTERISTICS
OF SUPERSONIC COMPRESSORS
Filed May 22, 1952 3 Sheets-Sheet 1

INVENTOR.
JOHN R. ERWIN
BY
*[signatures]*
ATTORNEYS

Sept. 18, 1956 J. R. ERWIN 2,763,426
MEANS FOR VARYING THE QUANTITY CHARACTERISTICS
OF SUPERSONIC COMPRESSORS
Filed May 22, 1952 3 Sheets-Sheet 2

INVENTOR.
JOHN R. ERWIN
BY
ATTORNEYS

United States Patent Office 2,763,426
Patented Sept. 18, 1956

2,763,426

MEANS FOR VARYING THE QUANTITY CHARACTERISTICS OF SUPERSONIC COMPRESSORS

John R. Erwin, Hampton, Va.

Application May 22, 1952, Serial No. 289,418

2 Claims. (Cl. 230—114)

(Granted under Title 35, U. S. Code (1952), sec. 266)

This invention relates to improvements in supersonic compressors, and particularly to means for varying the quantity characteristic of such compressors.

Supersonic axial flow compressors of the type described by Arnold H. Redding in U. S. Patent 2,435,236, have a performance characteristic that is undesirable from an operating standpoint. At a given rotational speed in the supersonic range, the quantity flow is fixed and cannot be varied unless the inefficient condition of blade stall or surging is encountered. It is an object of this invention to provide means for obtaining a varying quantity flow with supersonic compressors even though the rotational speed remains constant.

This invention also provides a solution to a second important problem in the application of supersonic compressors. Previously, because supersonic compressors exhibited no variation of quantity flow at a given rotational speed, the possibility of operating two or more such compressors in series, to obtain high over-all pressure ratios seemed remote, as the exact matching of two or more such compressors would have been almost a mechanical impossibility and at best highly impractical to even attempt. Through this invention, however, it becomes quite possible to operate such compressors in series, as the performance of supersonic compressors hereafter need not be so critical with regard to the flow quantity at a given rotational speed.

A further object of the invention is to provide suitably actuated means in an axial flow type supersonic compressor for varying the axial flow velocity relative to the local velocity of sound, and hence, the flow quantity, within limits, without significantly affecting the rotor performance by controlling the throat configuration of the compressor. This result is obtained because all shock waves emanating from the rotor blades can proceed only downstream, within the aforementioned limits, and so cannot influence the flow quantity which is determined by the passage configuration upstream of the rotor. Thus it is possible to vary the flow quantity by varying the entrance passage configuration without greatly altering the performance of the rotor. This behavior is analogous to that of a supersonic nozzle of the converging-diverging type, in which the flow quantity is unaffected by the downstream pressure so long as a portion of the nozzle is supersonic.

A more specific object of the invention is to carry out the previously set forth functions of obtaining a variable flow quantity in a supersonic compressor with constant rotational speed through the use of supersonic axial velocities entering the rotor or rotors by varying the flow passage area ratio between an upstream minimum area and the rotor entrance area.

Another object of the invention is to provide means in the compressor flow passage for forming a nozzle when the free air entrance velocity is subsonic and the same means forming a variable area diffuser when the free air entrance velocity is supersonic. Accordingly, the invention is useful with conventional axial flow compressors which are designed to operate at peak performance through a narrow range of entrance velocities, usually subsonic axial entrance velocities.

Other objects and features of importance will become apparent in following the description of the several illustrated means of practicing the invention.

Figure 4:
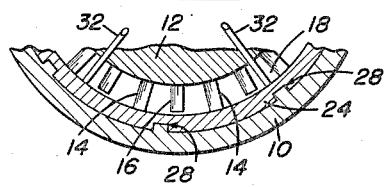
Fig. 4 is an enlarged sectional view taken on the line 4—4 of Fig. 1 and in the direction of the arrows.

The compressors described herein find their prime field of utility in aircraft. A jet engine of the type requiring a compressor has among other components, a casing structure 10 (Figs. 1 and 4), a nose portion 12, a plurality of circumferentially spaced guide vanes 14 fixed to the nose portion 12 and the casing structure, together with a compressor rotor 16. The nose portion 12 constitutes a part of the engine central core structure which defines with the casing structure 10, an annular flow passage 18 through which the medium to be compressed flows. The compressor is of the axial flow type with an air inlet 20 at the front end of the flow passage and an air entrance 22 immediately in advance of the rotor 16.

Figure 1:
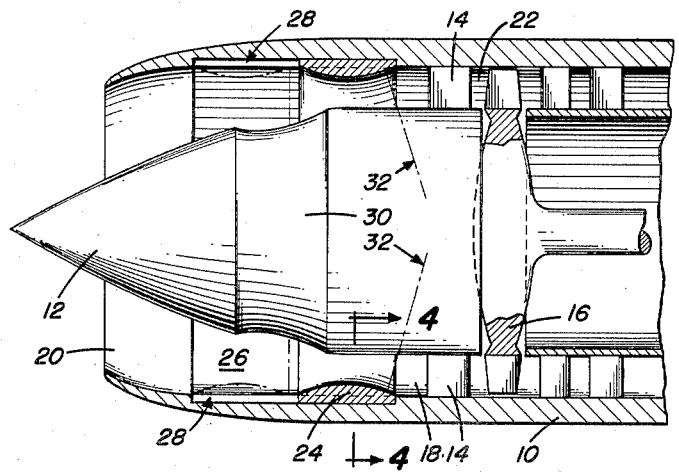
Fig. 1 is a fragmentary longitudinal sectional view of an axial flow compressor having one flow passage area ratio varying means shown in two positions.

Supersonic axial flow compressors of the type under consideration require that the rotor speed be maintained constant in order to avoid poor performance, as explained previously. This means that for practical considerations the quantity of flow will be constant thereby imposing a serious limitation on the engine compressor which affects the entire engine adversely. With the present invention practiced in the ways illustrated and other variations, the axial flow velocity relative to the local velocity of sound entering the rotor 16 can be varied and thus the flow quantity changed without significantly affecting rotor performance. To accomplish this, there are one or more mechanical elements disposed in the flow passage 18 between the inlet 20 and the entrance 22. In the embodiment of Fig. 1 the mechanical element is a ring 24 with a rounded inner surface contour. The ring may be monobloc or constructed of several segments, but in either case the ring is slidably disposed in an annular recess 26 formed in the casing structure wall inner surface. Rib and slot assemblies 28 in and between the element 24 and the casing structure constitute guideways for the element 24 preventing it from rotating and limiting the travel of the element to axial relative to the flow passage 18.

The element 24 coacts with the surface of the nose portion 12 and the annular groove 30 thereof to form a restriction which varies the axial velocity relative to the local velocity of sound an amount that is dependent upon the adjusted position of the element 24. Accordingly, the flow quantity entering the rotor 16 will be varied, and even though the rotor operates at a constant speed the realm of efficient rotor operation, within limits, is not exceeded. This is true because within the limits mentioned, all shock waves emanating from the rotor blades can proceed only downstream, and so they cannot influence the flow quantity which is determined by the passage configuration upstream of the rotor 16. This behavior, although paradoxical, is analogous to that of a supersonic nozzle of the converging-diverging type, in which the flow quantity is unaffected by the downstream pressure so long as a portion of the nozzle is supersonic.

Inasmuch as a large variety of means for actuating the element 24 may be used, and each is a well known expedient linkage 32 is shown schematically, the linkage being pivotally connected at one end to the element 24 and at the other end to a pilot control for manual operation, or to an element of a device for automatic operation, the device obtaining its information from static or total pressure downstream of the compressor stage or stages, turbine inlet or tailpipe temperature.

Figure 5:
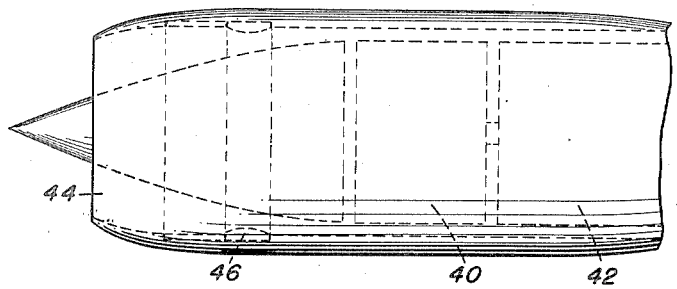
Fig. 5 is a schematic view showing multistaging of supersonic compressors, each of which operates at constant rotor speed.
Figure 6:
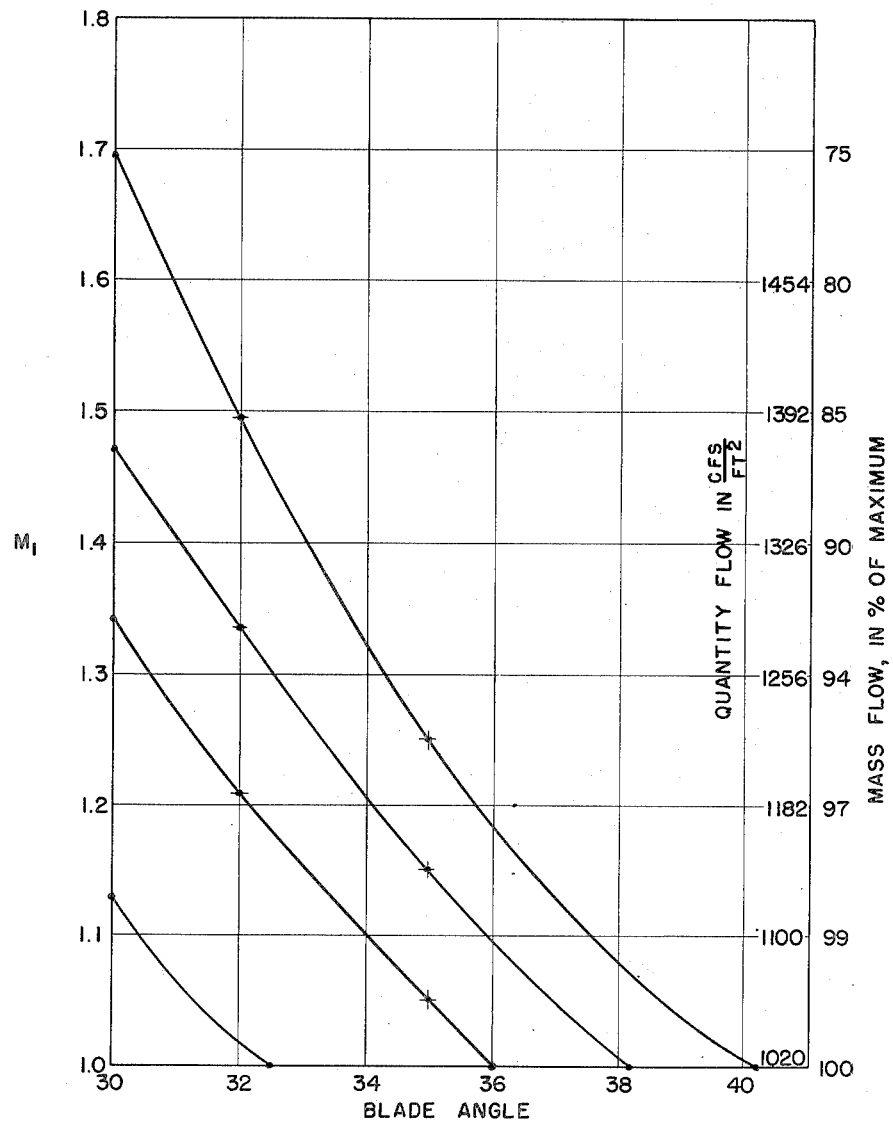
Fig. 6 is a graph supplying various operational information.

An important problem, that is multistaging of supersonic compressors, can be solved to obtain high overall pressure ratios. Heretofore, this was practically impossible due to the criticality of a supersonic compressor with constant rotor speed. As shown in Fig. 5 the actual arrangement is simple, there being a first compressor 40 and a second compressor 42 in tandem therewith, each mounted in the casing 44. But by virtue of the presence of the mechanical element 46 which may be similar to any of the corresponding elements of each disclosed embodiment, multistaging is possible due to the varying of flow quantity of the supersonic compressor at a given rotational speed.

It has been stated previously that there are operating limits within which the constant speed supersonic compressor criticality is removed. The limiting condition is reached when the following equation is satisfied.

$$\frac{1}{M_1{}^2} = 1 - \frac{\gamma+1}{2} \frac{\sin(\tau-\alpha)}{\sin(\tau)\cos\alpha}$$

where $M_1$ = entrance axial velocity at rotor relative to the local velocity of sound
$\gamma$ = ratio of specific heats, 1.4 for standard air
$\alpha$ = blade entrance region angle
$\tau$ = angle whose tangent = $\frac{V_1}{U}$
$V_1$ = entrance axial velocity
$U$ = rational velocity of blade In cases where the entrance velocity to the rotor is not axial, a correction must be made to this limit equation.

Curves have been calculated from the limit equation for three rotational speeds and for a range of blade angles. Only lower limits are presented, as the practical upper limit appears to be more a function of the losses in the compressor rotor passages at high Mach numbers rather than a function of shock progression upstream from the rotor. Scales on the right side of the plot indicate roughly the variable quantity and mass flows that can be obtained using this principle. For example, a compressor having a rotor blade angle of 38.2° operating with 1300 feet per second rotational speed can vary its mass flow 10 percent by altering the entrance-area ratio to achieve an entrance Mach number at the rotor of $M_1 = 1.4$. Under the same conditions, the quantity flow can vary almost 30 percent. This change of flow values produces an increase in the Mach number relative to the moving blades of from $M_2 = 1.62$ to $M_2 = 1.96$. While it is believed that changes of this order of magnitude can be accepted by properly designed rotor blades without great inefficiency, present understanding of such flows suggests that greater variations of $M_2$ would be accompanied by inefficient flows having intolerable losses. Thus, practical upper limits appear at values under $M_1 = 2.0$, in designs having a lower limit of $M_1$ in the range of $M_1 = 1.0$ to 1.4.

For use in aircraft flying at speeds greater than the local speed of sound, this type of compressor becomes of equal ease of application to the conventional axial-flow compressor requiring subsonic axial entering velocities. This is because the variable upstream entrance area, which acts as a nozzle to accelerate the flow when flight is at subsonic speeds, becomes a variable area diffuser when the flight speed becomes supersonic. Such variable area diffusers are usually required for compressors having subsonic entering velocities when flight speeds are supersonic. Because of the range of operable entrance velocities, properly designed compressors utilizing supersonic entrance velocities need have no diffuser when flight Mach numbers do not exceed the efficient range, which, for compressor types now contemplated, may be from $m = 1.0$ to $m = 1.6$. The application of this type of compressor may be less complicated for this flight speed range.

Figure 2:
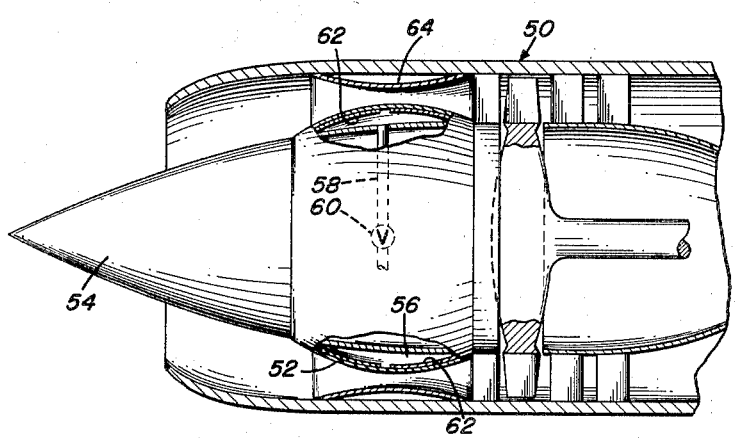
Fig. 2 is a fragmentary longitudinal sectional view of a compressor as in Fig. 1, but having a different type of ratio varying means.

Attention is now invited to Fig. 2 where the compressor 50 is provided with a variant of the element 24. A diaphragm 52 is secured to the nose portion 54 and provides with the nose portion 54 a fluid chamber 56 which is connected with a source by conduit 58 in which a valve 60 is located (schematically shown). Support and pressure plates 62 are provided in the chamber 56 and contact the inner surface of the diaphragm 52. A ring 64 having a rounded surface, is secured to the inner wall of the casing 50 to coact with the diaphragm 52 in the flow passage for the same purposes described in detail in connection with the embodiment of Fig. 1. The principle of operation is also the same with the exception that the element 52 is displaced laterally of the nose portion 54 to vary the size of the restriction in the flow passage, while the element 24 is slid axially of the flow passage.

Figure 3:
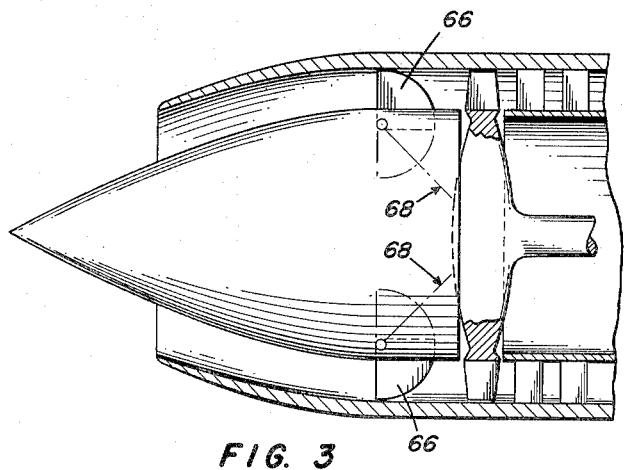
Fig. 3 is a third specie of the invention.

The embodiment of Fig. 3 serves the purpose of showing the use of pivoted vanes 66 to vary the throat area at a point intermediate the axial air inlet and the rotor entrance. Schematically illustrated linkage 68 functions as the linkage 32. In each embodiment the variant element is shown connected to the nose portion or casing structure, however, either location is satisfactory. That is, in the instances where the nose portion was selected as the place of application of the element, the casing structure could have been selected, and the reverse holds true. Also, it is contemplated that both the casing structure and the nose portion accommodate the elements 24, 52 or 66 simultaneously. These elements may be separate from both walls and secured in the center of the flow passage. The guide vanes 14 of each embodiment may be omitted or located in advance of the restriction producing elements, depending upon design characteristics for the best location.

It is apparent that various modifications of the described and shown forms may be made to practice the invention. Accordingly, limitation is sought only in accordance with the scope of the following claims.

The invention described herein may be manufactured and used by or for the Government of the United States of America for governmental purposes without the payment of any royalties thereon or therefor.

What is claimed is:

1. The combination with a compressor casing structure having an axial flow passage in which there is a constant speed rotor, of means for varying the quantity of flow through said passage while maintaining the rotor operating at a constant speed, said means including an element disposed in said passage and movable to vary the passage cross sectional area at a point in advance of said rotor said element comprising a ring having a rounded flow deflecting surface, and means including a recess in said casing structure in which said ring is mounted for constraining the movement of said ring to sliding motion axially of said flow passage.

2. An axial flow compressor arrangement comprising a first supersonic compressor having a constant speed rotor, a second supersonic compressor also having a constant speed rotor in alignment with the first supersonic compressor, both of said rotors arranged to receive flow with supersonic axial velocity, a casing in which said first and second compressors are disposed, said casing having a free air inlet at one end of a flow passage, means including a mechanical element disposed in said passage downstream of said inlet for obtaining a variation in the flow quantity of air through said passage by varying the axial velocity within definite limits of air entering said compressor rotor, said casing having a recess that opens into said flow passage, and said mechanical element being slidable in said recess substantially axially of said casing.

References Cited in the file of this patent

UNITED STATES PATENTS

| | | |
|---|---|---|
| Re. 22,844 | Traupel | Feb. 18, 1947 |
| 2,409,433 | Hunter | Oct. 15, 1946 |
| 2,434,678 | Szczeniowski | Jan. 20, 1948 |
| 2,540,594 | Price | Feb. 6, 1951 |
| 2,570,629 | Anxionnaz et al. | Oct. 9, 1951 |
| 2,628,768 | Kantrowitz | Feb. 17, 1953 |

FOREIGN PATENTS

| | | |
|---|---|---|
| 789,467 | France | Aug. 19, 1935 |